United States Patent [19]

Kakimoto

[11] 4,420,060

[45] Dec. 13, 1983

[54] ENGINE MOUNT ARRANGEMENT

[75] Inventor: Toshihiko Kakimoto, Tokyo, Japan

[73] Assignee: Nissan Motor Co., Ltd., Yokohama, Japan

[21] Appl. No.: 257,177

[22] Filed: Apr. 24, 1981

[30] Foreign Application Priority Data

May 2, 1980 [JP] Japan ................................ 55-58963

[51] Int. Cl.³ ............................ F16F 9/10; B60K 5/00
[52] U.S. Cl. .................................. 180/300; 248/631; 267/140.1; 267/141
[58] Field of Search .................... 180/300; 123/192 R; 267/140.1, 141, 141.2, 35, 64.25, 64.27; 248/659, 636, 631, 562

[56] References Cited

U.S. PATENT DOCUMENTS

| 1,738,532 | 12/1929 | Harbour | 123/192 R |
| 2,387,066 | 10/1945 | Harding | 267/134 |
| 2,878,012 | 3/1959 | Crites | 248/631 |
| 2,919,883 | 1/1960 | Murphy | 267/140.1 |
| 2,936,860 | 5/1960 | Peras | 267/64.27 |
| 3,137,466 | 6/1964 | Rasmussen | 248/631 |
| 3,698,703 | 10/1972 | Hipsher | 248/562 |
| 3,897,856 | 8/1975 | Pineau | 267/35 |

FOREIGN PATENT DOCUMENTS

| 14742 | 9/1980 | European Pat. Off. | |
| 38062 | 10/1981 | European Pat. Off. | 267/64.27 |
| 5730 | 12/1979 | Fed. Rep. of Germany | 267/140.1 |
| 2168680 | 8/1973 | France | 267/35 |
| 2356847 | 1/1978 | France | 267/35 |
| 2384999 | 10/1978 | France | 267/35 |
| 2415241 | 8/1979 | France | 267/140.1 |
| 6819 | 9/1980 | France | 267/35 |
| 2448673 | 9/1980 | France | 267/140.1 |
| 531245 | 6/1955 | Italy | 267/35 |
| 811748 | 4/1959 | United Kingdom | 267/64.23 |
| 2041486 | 9/1980 | United Kingdom | 248/652 |
| 2041488 | 9/1980 | United Kingdom | 248/639 |
| 1581935 | 12/1980 | United Kingdom | 267/140.1 |

Primary Examiner—Joseph F. Peters, Jr.
Assistant Examiner—Timothy Roesch
Attorney, Agent, or Firm—Schwartz, Jeffery, Schwaab, Mack, Blumenthal & Koch

[57] ABSTRACT

An engine mounting arrangement includes elastomeric mounting blocks interposed between laterally extending arms connected to the engine and brackets fixed to a cross member of the chassis near the outboard ends thereof. The blocks are adapted to undergo shear upon the engine rolling about an essentially longitudinal axis. The arrangement further includes a mounting unit including an elastomeric chamber defining member which readily undergoes shear without changing the volume the chamber which it defines when the engine rolls but which undergoes a volume change upon the engine bouncing or vibrating in the vertical direction. The volume change pumps working fluid from the chamber to a second variable volume chamber and vice versa through a flow restriction so that vertical movement of the engine is strongly damped but rolling readily permitted. The arrangement further minimizes the transmission of vibration from the engine to the chassis and the tendency of the cross member per se to be vibrated.

11 Claims, 6 Drawing Figures

ENGINE MOUNT ARRANGEMENT

BACKGROUND OF THE INVENTION

1. Field of the Invention

The present invention relates generally to a mounting arrangement for an internal combustion engine or the like and more particularly to a mounting arrangement wherein an engine is permitted to roll about a longitudinal extending axis with little restraint while vertical movement with respect to the chassis or the like is damped strongly as compared with the damping of the rolling motion.

2. Description of the Prior Art

In a known arrangement such as shown in FIG. 1 of the drawings an engine 4 has been supported on a chassis 1 by a combination of elastomeric insulator blocks 2 and either one or a pair of shock absorbers 3 (the location of the single shock absorber is shown in phantom). With this arrangement rolling of the engine 1 about an axis extending essentially longitudinally through the engine been is relatively weakly resisted while the vertical vibration or "bouncing" action of the engine is strongly damped by the action of the shock absorber or absorbers. However, this arrangement has suffered from the drawback that as metallic shock absorbers 3 are used vibration is transmitted to the cross member 5 of the chassis 1 through the shock absorbers due to the friction between the two telescopic halves and the gas reaction within the shock absorber itself. This vibration tends to induce resonance noise in the cabin of the vehicle.

Further, in order to reduce the resistance to the rolling motion of the engine the elastomeric mounting blocks 3 have been located relatively close to the engine. However, this in turn has caused a problem that the end vibrational force is effectively applied to the cross member 5 at points well inboard of the ends thereof thus rendering it susceptible to be vibrated by the vibrational force applied thereto. The vibration of the cross member 5 is of course highly undesirable as this will also produce resonance noise in the cabin of the vehicle.

SUMMARY OF THE INVENTION

The present invention takes the form of an engine suspension system including a unique mounting unit or insulator comprised of soft vibration absorbing elastomeric members which define first and second variable volume fluid chambers. The chambers are partitioned and communicated via a flow restriction. Thus, when the engine rolls this motion distorts one of the chambers but does not particularly vary the volume thereof whereas when the engine tends to bounce (viz., vibrate in the vertical direction) the volume of the first chamber is changed forcing fluid from one chamber to the other. The provision of the flow restriction limits the rate at which the fluid may be transferred from one chamber to the other whereby the mounting unit strongly damps the "bouncing" of the engine. Further, the nature of the elastomeric members defining the chambers prevents any transmission of vibration from the engine to the chassis through the mounting unit.

The additional chamberless elastomeric mounting blocks or insulators used to support the engine are mounted on the cross member near the outboard ends thereof to reduce the tendency for the cross member to be vibrated. These elastomeric units are relatively soft and disposed so that the rolling action of the engine tends to shear same thus achieving a desired low resistance to the rolling of the engine.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
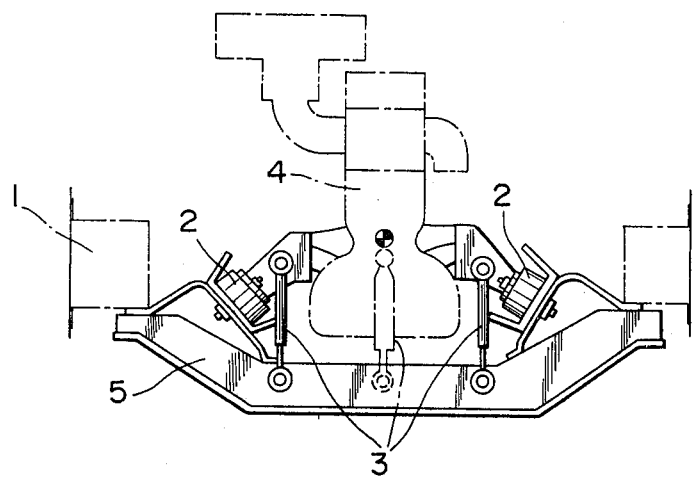
FIG. 1 is a schematic front elevational view of the prior art arrangement discussed under the heading of "Description of the Prior Art"
Figure 2:
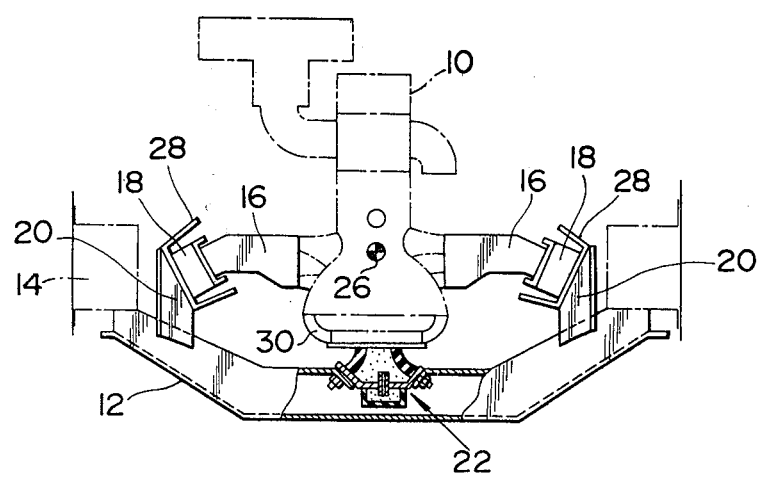
FIG. 2 is a schematic front elevational view of a mounting arrangement according to the present invention.
Figure 3:
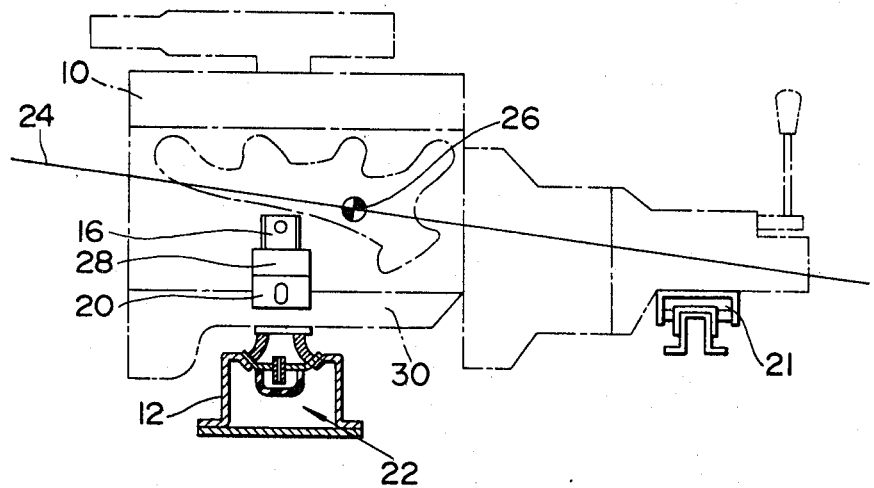
FIG. 3 is a side elevational view of the arrangement shown in FIG. 2.

Turning now to the drawings and more particularly to FIGS. 2 and 3, an engine mounting arrangement according to the present invention is shown. In this arrangement an engine 10 is mounted on a cross member 12 of a chassis 14. The engine has a pair of supporting arms 16 fixed thereto which extend laterally thereof. A pair of elastomeric (chamberless) mounting blocks 18 are disposed, as shown, at the ends of the arms and serve to connect same to mounting brackets 20 fixedly connected to the cross member 12 near the outboard ends thereof. A third mounting block 21 is disposed below the transmission (see FIG. 3).

Located beneath the engine proper is a dual chamber mounting unit or insulator 22. This unit, as shown, is in part located within the hollow of the cross member 12. The elastomeric mounting blocks are arranged to be relatively soft so as to readily undergo shear and thus be readily distortable to permit rolling of the engine about the axis 24 which, as shown in FIG. 3, passes through the center of gravity 26 of the engine and associated transmission. To limit the amount of shearing of the mounting blocks 18, limits 28 are provided on the mounting brackets.

Figure 4:
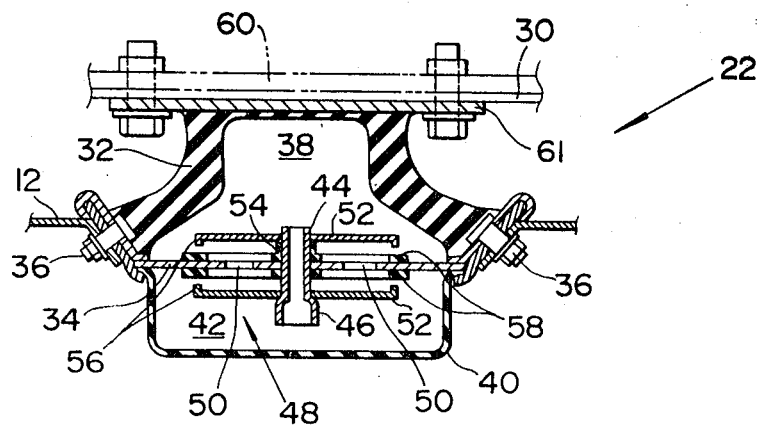
FIG. 4 is sectional view of a first embodiment of a dual chamber mounting unit utilized in the mounting arrangement of the present invention.

FIG. 4 shows an enlarged sectional view of the dual chamber mounting unit 22 interconnecting the oil pan 30 of the engine 10 and the cross member 12. This mounting unit takes the form of a first relatively thick but highly flexible elastomeric member 32 sealingly connected to a partition plate 34 which is connected via bolts 36 to the cross member 12. A first variable volume chamber 38 is defined between the first elastomeric member 32 and the partition plate. A second thinner elastomeric member 40 is fixed to the lower side of the partition plate to define a second variable volume chamber 42. A flow restriction 44 is disposed through the partition plate to provide fluid communication between the first and second variable volume chambers. The flow restriction is formed with a flare 46 at one end thereof. A flow rate responsive valve arrangement 48 is preferably provided in addition to the flow restriction.

This valve arrangement takes the form of an aperture or apertures 50 formed in the partition plate 34 and aperture closure plates 52 disposed on either side of the partition plate 34 opposite the aperture or apertures. Each of the plates 52 is flexible and mounted on the flow restriction 44. The upper plate is held in position by an elastomeric grommet 54 while the lower of the plates is supported by the flare 46. The peripheral edges of the plates 52 have flanges 56 thereon which are seatable on annular sealing rings 58 disposed on either side of the partition plate at positions juxtaposed the flanges.

A reinforcement member 60 is disposed within the oil pan per se to increase the structural strength and rigidity thereof sufficiently to withstand the additional load place thereon by the mounting unit. To connect the mounting unit to the engine the upper surface of the first elastomeric member 32 is fixedly bonded or otherwise connected to a connection plate 61 which in turn is bolted (sealingly) to the oil pan 30 and the reinforcement member disposed therein.

With the afore described arrangement when the engine rolls about the axis the mounting blocks 18 undergo shear thus weakly resisting this motion. Simultaneously, the first or upper elastomeric member 32 of the mounting unit 22 is also subject to shear, distorting the configuration of the first variable volume chamber but not changing the volume thereof to any particular degree. Accordingly, little of the working fluid contained in the mounting unit is forced from the first chamber to the second one. Further, due to the nature of the first elastomeric member 32 no vibration is transmitted to the cross member as different from the case wherein metallic shock absorbers are used.

However, upon the engine tending to "bounce" or vibrate in a direction vertical with respect to the chassis 14 on which it is mounted, the first elastomeric member of the mounting unit 22 is compressed thus inducing a sudden and definite change in the volume of the first variable volume chamber 38. Accordingly, working fluid is forced to flow from one chamber to the other. Given that rate of change of the first variable volume chamber is above a predetermined level, due to the resistance to flow which occurs between the flanges 56 and the sealing rings 58, a pressure differential is induced across the plate 52 flexing it down onto the sealing rings 58, thus effectively closing apertures 50. The closure of apertures 50 of course increases the resistance to fluid flow between the two chambers thus increasing the damping effect of the unit.

Figure 5:
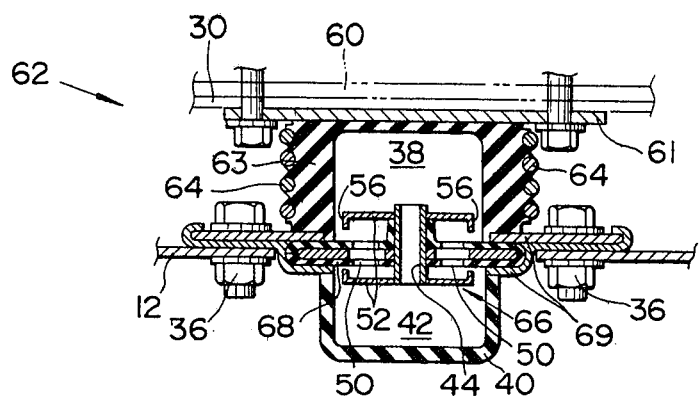
FIG. 5 is a sectional view of a second embodiment of dual chamber mounting unit.

FIG. 5 shows a second embodiment of a dual chamber mounting unit. This unit 62 differs from the first in that in this case the first elastomeric member 63 is thinner than that of previous arrangement and provided with a reinforcing coil spring or series of rings 64 about the external periphery thereof to prevent lateral expansion which would otherwise reduce the amount of fluid pumped from one chamber to the other. Further, the flow rate responsive valve 66 is arranged to be supported on a flexible partition member 68 so that upon a given rate of flow occurring between the two chambers the flexible partition member is deflected whereby the aperture closure plates 52 and the flow restriction 44 move as a unit and bring a flange of one of the aperture closure plates 52 into contact with the flexible partition member 68. The flexible partition member is secured in place through the use of two clamping members 69 which sandwich the partition therebetween. Further, due to the elastomeric nature of the partition the annular sealing rings 58 of the previous embodiment can be dispensed with.

To connect the unit 62 to the engine the upper surface of the first elastomeric member 63 is secured to the lower surface of the oil pan 30 and to a reinforcement member 60 disposed in the oil pan per se.

The operation of this unit is essentially the same as that of the first, other than the operation of the flow rate responsive valve and as such does not require a detailed explanation.

Figure 6:
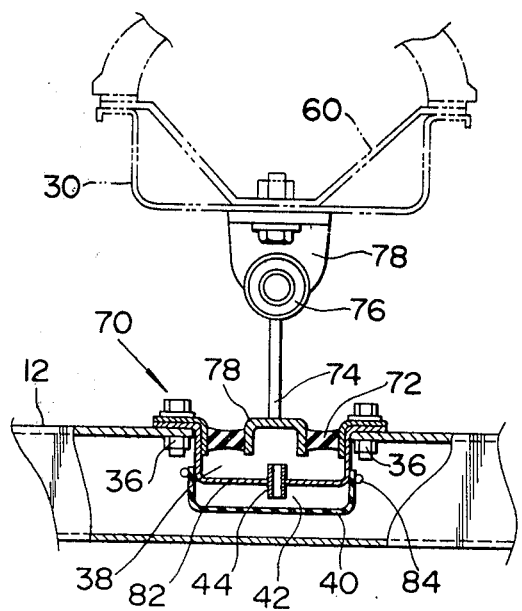
FIG. 6 is a partly sectional view of a third embodiment of dual chamber mounting unit.

FIG. 6 shows a third embodiment of the dual chamber mounting unit. This unit 70 differs from the previous two in that the first or upper flexible member 72 defining the first variable volume chamber is connected to the oil pan 30 of the engine 1 through a rod 74 and an annular elastomeric bush 76. The annular elastomeric bush is mounted on a bracket 78 secured to the oil pan. The oil pan is like the previously described embodiments reinforced internally with a reinforcement member 60. The lower end of the rod 74 is connected to a cup like member 78 which is bonded or otherwise securely fixed to the first elastomeric member.

Although a single flow restriction 44 is shown in this embodiment it is of course possible to provide in addition thereto a flow rate responsive arrangement such as shown and described in connection with FIG. 4. The second elastomeric member 40 is in this case held in place on the partition plate 82 by a fastener 84.

The operation of this embodiment is a little different from the preceeding ones in that the first elastomeric member is subject to shear both when the engine rolls and bounces. However, like the previous embodiments during rolling the volume of the first variable volume chamber varies very little while during bouncing the working fluid is pumped back and forth between the chambers to provide a damping effect. The provision of the rod and rubber bush serves to additionally absorb vibration through the twisting and deformation of the elatomeric bush 76 which maybe provided with a suitable perforate structure or webbing to increase the vibration absorption characteristics thereof.

Thus in summary, the present invention strongly damps vertical movement of an engine but readily permits same to roll and simultaneously prevent the transmission of resonance noise inducing vibration from the engine to the chassis. This is achieved by using a combination of a unique dual chamber insulator and main engine support blocks adapted to readily undergo shear and which are connected to the chassis so as to induce the least vibration therein.

What is claimed is:
1. In a vehicle:
an engine;
a transmission operatively connected to said engine;
a chassis for supporting said engine and transmission; and
a mounting arrangement comprising:
supporting arms extending laterally from said engine;
elastomeric insulators, one disposed at the end of each of said supporting arms for interconnecting said engine to said chassis, said insulators being adapted to undergo shear and permit said engine to roll about an axis which extends therethrough; and
a mounting device disposed below said engine and interconnecting said engine and said chassis, said mounting device comprising:
a partition connected to said chassis;

a first flexible member mounted on a first side of said partition to define a first variable volume chamber, said first flexible member being connected to said engine;

a second flexible member mounted on a second side of said partition to define a second variable volume chamber, said first and second chambers containing therein a working fluid;

a flow restriction disposed through said partition for fluidly interconnecting said first and second fluid chambers; and a valve arrangement which closes to increase the flow resistance from said first to said second chamber and from said second to said first chamber in response to a predetermined rate of fluid flow therebetween.

2. A mounting arrangement as claimed in claim 1, further comprising a coil spring disposed about the external surface of said first flexible member for preventing expansion thereof when said first flexible member is subject to a force which tends to reduce the volume of said first variable volume chamber.

3. A mounting arrangement as claimed in claim 1, further comprising
a rod fixedly connected to said first flexible member at one end thereof, and
an elastomeric bush disposed at the other end of said rod for connecting said rod to said engine, said rod and said bush providing said connection between said engine and said mounting device.

4. A mounting arrangement as claimed in claim 1, wherein said valve arrangements comprises
means defining an aperture in said partition, and
aperture closure plates disposed on either side of said partition opposite said aperture, said plates being flexible and adapted to flex toward and contact said partition upon a predetermined rate of flow occurring between said first and second chambers.

5. A mounting device as claimed in claim 1, wherein said partition is flexible and wherein said valve arrangement takes the form of
means defining an aperture in said flexible partition, and
aperture closure plates disposed on either side of said flexible partition which plates are adapted to contact said flexible partition upon working fluid being transferred from one chamber to the other at or above a predetermined rate and said flexible partition flexing under the pressure differential existing between said first and second chambers.

6. A mounting device as claimed in claim 1, wherein said valve arrangement comprises:
means defining an aperture in said partition; and
aperture closure plates disposed on either side of said partition opposite said apeture, said plates being adapted to contact said partition upon said predetermined rate of flow occurring between said first and second chambers and between said second and first chambers.

7. A mounting arrangement as claimed in claim 6, wherein said plates are flexible and adapted to flex toward and contact said partition upon said predetermined rate of flow.

8. A mounting arrangement as claimed in claim 6, wherein said partition is flexible and adapted to flex toward and contact said closure plates upon said predetermined rate of flow being induced by a pressure differential existing between said first and second chambers.

9. In a vehicle having an engine and a supporting structure for supporting said engine the combination of:
(1) supporting arms extending laterally from said engine;
(2) elastomeric insulators, one disposed at the end of each of said supporting arms for interconnecting said engine to said supporting structure, said insulators being adapted to undergo shear upon said engine rolling about an axis which extends therethrough; and
(3) a mounting device interconnecting said engine and said supporting structure, said mounting device comprising:
(a) a partition connected to said supporting structure;
(b) a first flexible member mounted on a first side of said partition to define a first variable volume chamber, said first flexible member being connected to said engine;
(c) a second flexible member mounted on a second side of said partition to defne a second variable volume chamber, said first and second chambers containing therein a working fluid;
(d) a flow restriction disposed through said partition for fluidly interconnecting said first and second fluid chambers; and
(e) a valve arrangement which closes to increase the flow resistance between said first and second chambers in response to a predetermined rate of fluid flow therebetween, said valve arrangement comprising:
(i) means defining an aperture in said partition, and
(ii) aperture closure plates disposed on either side of said partition opposite said aperture, said plates being flexible and adapted to flex toward and contact said partition upon a predetermined rate of flow occurring between said first and second chambers.

10. In a vehicle having an engine and a supporting structure for supporting said engine the combination of:
(1) supporting arms extending laterally from said engine;
(2) elastomeric insulators, one disposed at the end of each of said supporting arms for interconnecting said engine to said supporting structure, said insulators being adapted to undergo shear upon said engine rolling about an axis which extends therethrough; and
(3) a mounting device interconnecting said engine and said supporting structure, said mounting device comprising;
(a) a flexible partition connected to said supporting structure;
(b) a first flexible member mounted on a first side of said partition to define a first variable volume chamber, said first flexible member being connected to said engine;
(c) a second flexible member mounted on a second side of said partition to define a second variable volume chamber, said first and second chambers containing therein a working fluid;
(d) a flow restriction disposed through said partition for fluidly interconnecting said first and second fluid chambers; and (e) a valve arrangement which closes to increase the flow resistance between said first and second chambers in response to a predetermined rate of fluid flow therebetween, said valve arrangement comprising:
   (i) means defining an aperture in said flexible partition, and
   (ii) aperture closing plates disposed on either side of said flexible partition which plates are adapted to contact said flexible partition upon working fluid being transferred from one chamber to the other at or above a predetermined rate and said flexible partition flexing under the pressure differential existing between said first and second chambers.

11. In a vehicle:

an engine;

a transmission operatively connected to said engine;

a chassis for supporting said engine and transmission;

supporting arms extending laterally from said engine;

elastomeric insulators, one disposed at the end of each of said supporting arms for interconnecting said engine and said chassis, said insulators being adapted to undergo shear and permit said engine to roll about an axis which extends therethrough;

a partition which extends below said engine and which is connected to said chassis;

a first flexible member mounted on a first side of said partition to define a first variable volume chamber, said first flexible member being connected to said engine;

a second flexible member mounted on a second side of said partition to define a second varible volume chamber, said first and second chambers containing therein a working fluid;

a flow restriction disposed through said partition for fluidly interconnecting said first and second chambers;

means defining an aperture in said partition through which said first and second chambers fluidly communicate; and a valve arrangement for closing said aperture and preventing fluid flow from said first chamber to said second chamber and from said second chamber to said first chamber upon a predetermined rate of flow occuring therebetween.

* * * * *

UNITED STATES PATENT AND TRADEMARK OFFICE
CERTIFICATE OF CORRECTION

PATENT NO. : 4,420,060
DATED : December 13, 1983
INVENTOR(S) : TOSHIHIKO KAKIMOTO It is certified that error appears in the above-identified patent and that said Letters Patent is hereby corrected as shown below:

Claim 1, column 5, line 11, between "chambers" and ";" should read --, said flow restriction taking the form of a tube through which a first and constant fluid communication between said first and second chambers is established--.

Claim 1, column 5, line 16, between "therebetween" and "." should read --, said valve arrangement being mounted on the exterior of said tube and arranged to control a second fluid communication, discrete from said first fluid communication, between said first and second chambers--.

Claim 9, column 6, line 4, "engine the" should read --engine, the--.

Claim 9, column 6, line 27, "fluidly interconnecting" should read --providing a first constant communication between--.

Claim 9, column 6, line 34, between "partition" and "," should read --which provides a second and discrete fluid communication between said first and second chambers--.

Claim 9, column 6, line 41, between "chambers" and "." should read --in a manner to prevent fluid flow through said aperture--.

Claim 10, column 6, line 43, "engine the" should read --engine, the--.

Claim 10, column 6, line 66, "fluidly interconnecting" should read --providing a first constant communication between--.

Claim 10, column 7, line 7, between "partition" and "," should read --which provides a second and discrete fluid communication between said first and second chambers--.

UNITED STATES PATENT AND TRADEMARK OFFICE
CERTIFICATE OF CORRECTION

PATENT NO. : 4,420,060

DATED : December 13, 1983

INVENTOR(S) : TOSHIHIKO KAKIMOTO

It is certified that error appears in the above-identified patent and that said Letters Patent is hereby corrected as shown below:

Claim 10, column 7, line 15, between "chambers" and "." should read --in a manner to prevent fluid flow through said aperture--.

Claim 11, column 8, line 14, "fluidly interconnecting" should read --providing constant fluid communication between--.

Claim 11, column 8, line 18, between "municate" and ";" should read --, said aperture being discrete from said flow restriction--.

Signed and Sealed this

Fourth Day of September 1984

[SEAL]

Attest:

GERALD J. MOSSINGHOFF

Attesting Officer     Commissioner of Patents and Trademarks